US008606936B2

(12) United States Patent
Miyata

(10) Patent No.: US 8,606,936 B2
(45) Date of Patent: Dec. 10, 2013

(54) COMMUNICATION SYSTEM, SESSION CONTROL MANAGEMENT SERVER AND SESSION CONTROL METHOD

(75) Inventor: Hiroaki Miyata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 645 days.

(21) Appl. No.: 12/792,100

(22) Filed: Jun. 2, 2010

(65) Prior Publication Data
US 2010/0312903 A1 Dec. 9, 2010

(30) Foreign Application Priority Data

Jun. 3, 2009 (JP) ................................. 2009-133709

(51) Int. Cl.
*G06F 15/16* (2006.01)
(52) U.S. Cl.
USPC ........... 709/228; 370/352; 370/356; 370/389; 370/401; 455/410; 455/423
(58) Field of Classification Search
None
See application file for complete search history.

(56) References Cited

U.S. PATENT DOCUMENTS

| 6,496,511 | B1 * | 12/2002 | Wang et al. ..................... 370/401 |
| 6,564,261 | B1 * | 5/2003 | Gudjonsson et al. .......... 709/227 |
| 7,394,804 | B2 | 7/2008 | Miyata et al. |
| 7,882,214 | B2 * | 2/2011 | Ozaki et al. .................... 709/224 |
| 8,027,442 | B2 * | 9/2011 | Crandell et al. ........... 379/142.06 |
| 8,064,450 | B2 * | 11/2011 | Maggenti ....................... 370/392 |
| 8,111,687 | B2 * | 2/2012 | Kutt et al. ....................... 370/352 |
| 2005/0152363 | A1 * | 7/2005 | Malik et al. .................... 370/389 |
| 2005/0246419 | A1 * | 11/2005 | Jaatinen ......................... 709/204 |
| 2006/0268842 | A1 * | 11/2006 | Takahashi et al. ............. 370/352 |
| 2008/0025488 | A1 * | 1/2008 | Dean et al. ................. 379/201.11 |
| 2008/0045186 | A1 * | 2/2008 | Black et al. .................... 455/413 |
| 2008/0159271 | A1 * | 7/2008 | Kutt et al. ...................... 370/352 |
| 2008/0196098 | A1 * | 8/2008 | Cottrell et al. .................... 726/12 |
| 2008/0205617 | A1 * | 8/2008 | Sugawara et al. ......... 379/211.02 |
| 2009/0131022 | A1 * | 5/2009 | Buckley et al. ............. 455/412.1 |
| 2010/0246780 | A1 * | 9/2010 | Bakker et al. .................... 379/38 |
| 2010/0255825 | A1 * | 10/2010 | Bontempi et al. .......... 455/414.1 |
| 2010/0287286 | A1 * | 11/2010 | Bustamente ................... 709/228 |
| 2011/0044325 | A1 * | 2/2011 | Buckley ......................... 370/352 |

FOREIGN PATENT DOCUMENTS

| JP | 2002-010324 | 1/2002 |
| JP | 2004-228829 | 8/2004 |
| JP | 2007-006154 | 1/2007 |

OTHER PUBLICATIONS

Notification of Reasons for Refusal for Japanese Application No. 2009-133709, issued on Feb. 26, 2013.

* cited by examiner

*Primary Examiner* — Greg C Bengzon
(74) *Attorney, Agent, or Firm* — Antonelli, Terry, Stout & Kraus, LLP.

(57) ABSTRACT

To implement a calling party number anonymous service in an IP telephone service. An IP telephone terminal adds the setting of requesting a Pool IP address along with a normal IP address to a REGISTER message directed from the IP telephone terminal to an SIP server and requests the assignment of a temporary IP address if receiving an anonymous call incoming request message. The SIP server makes the temporary assignment of the Pool IP address and notifies the temporary IP address to a called party IP telephone terminal by adding it to an INVITE message, if the called IP address of the anonymous call incoming request INVITE message is the IP telephone terminal. The called IP telephone terminal receiving the assignment of the temporary IP address can make the connection, communication and disconnection processes employing the temporary IP address as the self IP address in the following dialog.

13 Claims, 18 Drawing Sheets

| Subscriber management table | | | |
|---|---|---|---|
| # | Telephone number | SIP URI | IP address | Option |
| 1 | 045-111-1111 | user-1@A | IP4=10.0.0.1 | |
| 2 | 03-5000-1111 | user-1@B | IP4=11.0.0.1 | |
| 3 | 045-111-2222 | user-2@A | IP4=10.0.0.2 | |
| | | | | |
| m | 03-5600-mmmm | user-m@B | IP6=3001::m | |
| n | 045-116-nnnn | user-n@A | IP6=2001::n | |

| Subscriber management table | | | |
|---|---|---|---|
| # | Telephone number | SIP URI | IP address | Option |
| 1 | 045-111-1111 | user-1@A | IP4=10.0.0.1 | |
| 2 | 03-5000-1111 | user-1@B | IP4=11.0.0.1 | |
| 3 | 045-111-2222 | user-2@A | IP4=10.0.0.2 | |
| | | | | |
| m | 03-5600-mmmm | user-m@B | IP6=3001::m | |
| n | 045-116-nnnn | user-n@A | IP6=2001::n | |
| | | | | |
| s | 03-5000-2222 | user-2@B | IP4=11.0.0.2 | |
| t | 03-5000-2222 | user-2@B | IP4=pool | Anonymous call incoming time = Pool address assignment |

| | 241 | 242 | 24 243 | 244 | 245 | 246 |
|---|---|---|---|---|---|---|
| Connection management table | | | | | | |
| # | Connection start time | Disconnection time | Status | Calling party information | Called party information | Remarks |
| 1 | 2009/1/10 11:34:5 | 2009/1/10 11:51:10 | Disconnection | 03-5600-mmmm user-m@B IP6=3001::m | 045-116-nnnn user-n@A IP6=2001::n | |
| 2 | 2009/1/10 11:58:28 | | Invite process Wait for 200 OK message | Anonymous (045-111-1111) Anonymous@A (user-1@A) IP4=10.0.0.1 | 03-5000-2222 user-2@B Pool=11.0.0.202 (IP4=11.0.0.2) | Anonymous connection request /247 |
| 3 | | | | | | |

FIG. 5A

| Connection management table | | | | | | |
|---|---|---|---|---|---|---|
| # | Connection start time | Disconnection time | Status | Calling party information | Called party information | Remarks |
| 1 | 2009/1/10 11:34:5 | 2009/1/10 11:51:10 | Disconnection | user-m@B IP6=3001::m | user-n@A IP6=2001::n | |
| 2 | 2009/1/10 11:58:29 | | Talking | Anonymous (045-111-1111) Anonymous@A (user-1@A) IP4=10.0.0.1 | 03-5000-2222 user-2@B Pool=11.0.0.202 (IP4=11.0.0.2) | Anonymous connection request |
| 3 | | | | | | |

FIG. 5B

| Connection management table | | | | | | |
|---|---|---|---|---|---|---|
| # | Connection start time | Disconnection time | Status | Calling party information | Called party information | Remarks |
| 1 | 2009/1/10 11:34:5 | 2009/1/10 11:51:10 | Disconnection | user-m@B IP6=3001::m | user-n@A IP6=2001::n | |
| 2 | 2009/1/10 11:58:29 | 2009/1/10 12:4:12 | Disconnection | Anonymous (045-111-1111) Anonymous@A (user-1@A) IP4=10.0.0.1 | 03-5000-2222 user-2@B Pool=11.0.0.202 (IP4=11.0.0.2) | Anonymous connection request |
| 3 | | | | | | |

FIG. 5C

```
                                                              ~ M1
┌─────────────────────────────────────────────────┐
│ REGISTER sip:server-1.AB SIP/2.0                │
│ Via: SIP/2.0/UDP AB:5060;branch=z9hG4bKababab   │
│ Max-Forwards: 70                                │
│ From: 03-5000-2222 <sip:user-2@B>;tag=123456    │
│ To: 03-5000-2222 <sip:user-2@B>                 │
│ Call-ID: 654321@B                               │
│ CSeq: 1 REGISTER                      ~ M11     │
│ Contact: <sip:user-2@11.0.0.2>                  │
│ Contact: <sip:user-2@anonymous-pool>            │
│ Expires: 7200                                   │
│ Contact-Length: 0                               │
└─────────────────────────────────────────────────┘
```

FIG. 8

```
                                                          M101
INVITE sip:user-2@B SIP/2.0
Via: SIP/2.0/UDP B:5060;branch=z9hG4bKababab
Max-Forwards: 70                                          M1011
From: anonymous <sip:anonymous@A>;tag=qqqqqq
To: 03-5000-2222 <sip:user-2@B>
Call-ID: 111111@A                      M1012
CSeq: 1011 INVITE                      M1013
Contact: <sip:anonymous@10.0.0.1>
Contact-type: application/sdp
Contact-Length: xxx v=0
o=anonymous 2890842807 28908427 IN IP4 A
s=Voice Session
c=IN IP4 10.0.0.1
t=0 0
m=audio 50000 RTP/AVP 0
a=rtpmap:0 PCMU/8000
```

FIG. 10

```
                                                                    M102
INVITE sip:user-2@B SIP/2.0
Via: SIP/2.0/UDP AB:5060;branch=z9hG4bKabcdef.1
Via: SIP/2.0/UDP AB:5060;branch=z9hG4bKababab
    ;received=10.0.0.1
Max-Forwards: 69                                                    M1021
From: anonymous <sip:anonymous@A>;tag=qqqqqq
To: 03-5000-2222 <sip:user-2@B>;pool=IN IPv4 11.0.0.202
Call-ID: 111111@A
CSeq: 1011 INVITE
Contact: <sip:anonymous@10.0.0.1>
Contact-type: application/sdp
Contact-Length: xxx v=0
o=anonymous 2890842807 28908427 IN IP4 A
s=Voice Session
c=IN IP4 10.0.0.1
t=0 0
m=audio 50000 RTP/AVP 0
a=rtpmap:0 PCMU/8000
```

FIG. 11

```
                                                                  M103
┌─────────────────────────────────────────────────────┐
│ SIP/2.0 180 Ringing                                 │
│ Via: SIP/2.0/UDP AB:5060;branch=z9hG4bKabcdef.1     │
│      ;received=20.0.0.240                           │
│ Via: SIP/2.0/UDP AB:5060;branch=z9hG4bKababab       │
│      ;received=10.0.0.1                             │
│ Max-Forwards: 69                                    │
│ From: anonymous <sip:anonymous@A>;tag=qqqqqq        │
│ To: 03-5000-2222 <sip:user-2@B>;tag=456abc          │
│ Call-ID: 111111@A                                   │
│ CSeq: 1011 INVITE                     M1031         │
│ Contact: <sip:user-2@11.0.0.202>                    │
│ Contact-Length: 0                                   │
└─────────────────────────────────────────────────────┘
```

COMMUNICATION SYSTEM, SESSION CONTROL MANAGEMENT SERVER AND SESSION CONTROL METHOD

CLAIM OF PRIORITY

The present application claims priority from Japanese patent application JP 2009-133709 filed on Jun. 3, 2009, the content of which is hereby incorporated by reference into this application.

BACKGROUND OF THE INVENTION

1. Field of the Invention

The present invention relates to a communication system, a session control management server and a session control method, and more particularly to a communication system, a session control management server and a session control method for performing a response process in the case of receiving an anonymous call incoming request, with the session control in the internet.

2. Description of the Related Art

At present, with the spread of the internet, an IP telephone service using the internet is provided by each carrier and an Internet Service Provider (ISP). Also, in the IP telephone service, a Voice over IP (VoIP) communication for transferring voice data with an Real Time Transport Protocol (RTP) packet is performed by establishing a channel (session) between the terminals before starting the communication.

As a main session control protocol for making the session establishment and disconnection between the terminals, an Session Initiation Protocol (SIP) is specified for controlling the session between the terminals via an SIP server.

An SIP message is composed of a start line part and a header part for carrying the request or response information and a message body part for describing the session content, in which an Session Description Protocol (SDP), for example, is employed to describe the session content, and the other party of communication is identified by a request Uniform Resource Identifier (URI) described in the start line part. Also, in a process of establishing the session, the RTP packet communication conditions between the terminals, such as calling the receiver, each protocol for voice or video, and the bit rate, are decided.

SUMMARY OF THE INVENTION

In the IP telephone service, the session establishment between the terminals is basically made, employing the URI information such as the telephone numbers of the calling party and the called party, but since it has a calling party number anonymous service (hereinafter referred to as anonymous) in the same way as a telephone exchange service, the called party receiving an anonymous call can confirm the calling party by speech.

However, the IP telephone service, unlike the telephone exchange service, is specified to notify an IP address and so on for use in the RTP packet communication in establishing the session with an SIP message, so that the IP address of the called party is unconditionally notified to the calling party. Therefore, there is a problem that the IP address of the called party is known before confirming the calling party by speech.

Further, in the case of the malicious calling party, there is a possibility of causing a damage such as a Denial of Service (DOS) attack of flowing a large number of packets to the IP terminal after acquiring the IP address of the called party.

In Japanese Patent No. 2004-228829, a method for protecting the IP address of the calling party was described but the receiver side was not described.

In the light of the above-mentioned problems, an object of this invention is to provide a communication system, a session control management server and a session control method for implementing a calling party number anonymous service in the IP telephone service.

According to the invention, in an IP telephone network in which a plurality of IP telephone terminals having a function of making the communication employing a temporary IP address in receiving an anonymous call incoming request message, for example, are connected to an SIP server for assigning the temporary IP address from a Pool IP address, and adding the assigned temporary IP address to an INVITE message to be transferred in receiving an anonymous call incoming request INVITE message directed to an IP telephone terminal receiving a temporary IP address request message, the IP telephone terminal adds the setting of requesting the Pool IP address along with the normal IP address to a Contact field of a REGISTER message in registering the information with the SIP server, and requests the assignment of the temporary IP address if receiving the anonymous call incoming request message.

The SIP server, upon detecting the request setting in the REGISTER message, can register the information regarding the normal IP address and the information for assigning the Pool IP address at the anonymous call incoming request in a subscriber management table.

Also, the SIP server makes the temporary assignment of the Pool IP address and notifies the temporary IP address to the called party IP telephone terminal by adding it to a From field of the INVITE message, if the called party IP telephone terminal for the anonymous call incoming request INVITE message is the IP telephone terminal.

The called party IP telephone terminal receiving the assignment of the temporary IP address can make the connection, communication and disconnection processes employing the temporary IP address for the self IP address in the following dialog.

Under the above session control, the called party IP telephone terminal that communicates with a calling party IP telephone terminal for the anonymous call incoming request can make the communication without the self IP address known to the anonymous party.

The session control protocol is not the SIP, but the session control protocol such as an MGCP, H.248 may be employed in the same way as the SIP.

Though the method for assigning the Pool IP address from the SIP server has been described above, another method may be applied in which the called party IP telephone terminal requests a DHCP server for the temporary IP address if recognizing an anonymous call incoming request (Anonymous).

According to the first solving means of the present invention, there is provided a communication system in which a plurality of IP terminals are connected to a session control management server, the session control management server comprising:

a connection management table storing a status indicating talking or disconnected, calling party information and called party information; and a subscriber management table storing a telephone number, an identifier and an IP address for each subscriber;

wherein the session control management server extracts the calling party information and the called party information from a first connection request message received from an IP terminal, and registers a calling party address as the calling party information and a called terminal identifier as the called party information in the connection management table;

the session control management server sends a second connection request message including the called terminal identifier and a temporary IP address assigned to a called IP terminal in the called party information to the called IP terminal;

the called IP terminal extracts the called party information from the received second connection request message and sends a response message using the temporary IP address as a self IP address to the session control management server if the temporary IP address is included; and the session control management server makes the communication between a calling IP terminal and the called IP terminal under the session connection establishment control by referring to the connection management table with the temporary IP address.

According to the second solving means of the present invention, there is provided a session control management server in a communication system in which a plurality of IP terminals are connected to the session control management server, the session control management server comprising:

a connection management table storing a status indicating talking or disconnected, calling party information and called party information; and a subscriber management table storing a telephone number, an identifier and an IP address for each subscriber;

wherein the session control management server extracts the calling party information and the called party information from a first connection request message received from an IP terminal, and registers a calling party address as the calling party information and a called terminal identifier as the called party information in the connection management table;

the session control management server sends a second connection request message including the called terminal identifier and a temporary IP address assigned to a called IP terminal in the called party information to the called IP terminal;

the session control management server receives a response message employing the temporary IP address as the self IP address from the called IP terminal, and the session control management server makes a communication between the calling IP terminal and the called IP terminal under the session connection establishment control by referring to the connection management table with the temporary IP address.

According to the third solving means of the present invention, there is provided a session control method using a communication system in which a plurality of IP terminals are connected to a session control management server, the session control management server comprising:

a connection management table storing a status indicating talking or disconnected, calling party information and called party information; and a subscriber management table storing a telephone number, an identifier and an IP address for each subscriber;

wherein the session control management server extracts the calling party information and the called party information from a first connection request message received from an IP terminal, and registers a calling party address as the calling party information and a called terminal identifier as the called party information in the connection management table;

the session control management server sends a second connection request message including the called terminal identifier and a temporary IP address assigned to a called IP terminal in the called party information to the called IP terminal;

the called IP terminal extracts the called party information from the received second connection request message and sends a response message using the temporary IP address as a self IP address to the session control management server if the temporary IP address is included; and the session control management server makes the communication between a calling IP terminal and the called IP terminal under the session connection establishment control by referring to the connection management table with the temporary IP address.

With this invention, there can be provided a communication system and a session control method for implementing a calling party number anonymous service in the IP telephone service. For example, with this invention, it is possible to increase the security of the receiver side by notifying the temporary address as the IP address of the receiver under the session control.

BRIEF DESCRIPTION OF THE DRAWINGS

FIGS. 4A and 4B are views showing the organization of a subscriber management table.

FIGS. 5A, 5B and 5C are views showing the organization of a connection management table.

FIG. 8 is a view showing a description example of a REGISTER message (including a request example at the time of Anonymous).

FIG. 10 is a view showing a description example of an INVITE message (at the time of calling party Anonymous) from the calling party IP telephone terminal.

FIG. 11 is a view showing a description example of an INVITE message (at the time of calling party Anonymous and Pool IP address assignment) from the SIP server.

FIG. 12 is a view showing a description example of a 180 Ringing message (at the time of setting the called party IP address=Pool IP address) from the called party IP telephone terminal.

DETAILED DESCRIPTION OF THE PREFERRED EMBODIMENTS

The security on the receiver side can be increased by notifying a temporary address as the IP address of a receiver to the calling party under the session control as will be described in the following. An embodiment will be described below in detail with reference to the drawings.

A. System

Figure 1:
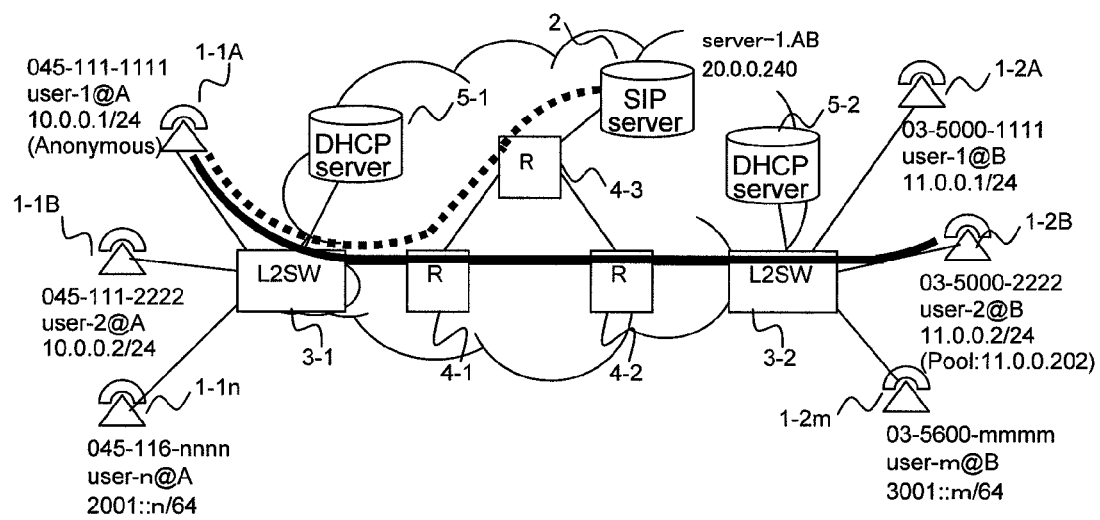
FIG. 1 is a diagram showing an IP telephone network configuration example.

FIG. 1 is a diagram showing a configuration example of an IP telephone network using an SIP as the session control protocol.

The network comprises a plurality of IP telephone terminals 1 (1-1A to 1-1n, 1-2A to 1-2m), an SIP server 2, an L2SW 3 (3-1, 3-2) for connecting each IP telephone terminal 1 to the routers (R) 4 (4-1 to 4-3) and the DHCP servers 5 (5-1, 5-2) for dynamically assigning the IP address. When the communication is made between each IP telephone terminal 1, first of all, an IP telephone terminal 1 registers with the SIP server 2. Next, for the SIP server 2, the connection control to communicate with the other party of communication is made via the SIP server 2 with an SIP message, and after the completion of session connection, the communication is made between the IP telephone terminals 1.

Figure 2:
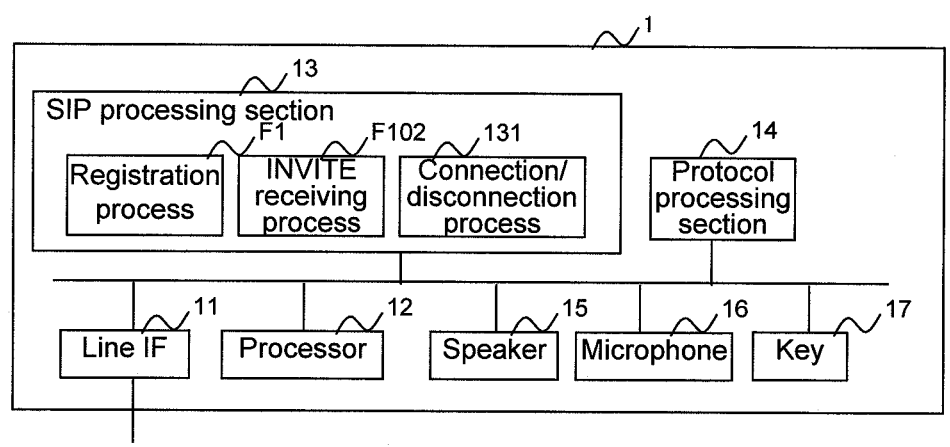
FIG. 2 is a block diagram showing the configuration of a main part of an IP telephone terminal.

FIG. 2 is a block diagram showing the configuration of a main part of the IP telephone terminal 1.

The IP telephone terminal 1 mainly comprises a line IF (interface) 11, a processor 12, an SIP processing section 13, a protocol processing section 14, a speaker 15 of user interface, a microphone 16 and a key 17. The SIP processing section 13 mainly performs a registration process (F1), an INVITE receiving process (F102) and a connection/disconnection process 131 in accordance with the information inputted by the key 17. The protocol processing section 14 performs a decode process for an RTP packet received from the line IF 11. The decoded voice is outputted from the speaker 15. Also, it performs an encode process for the voice inputted from the microphone 16, and sends an RTP packet from the line IF 11.

Figure 3:
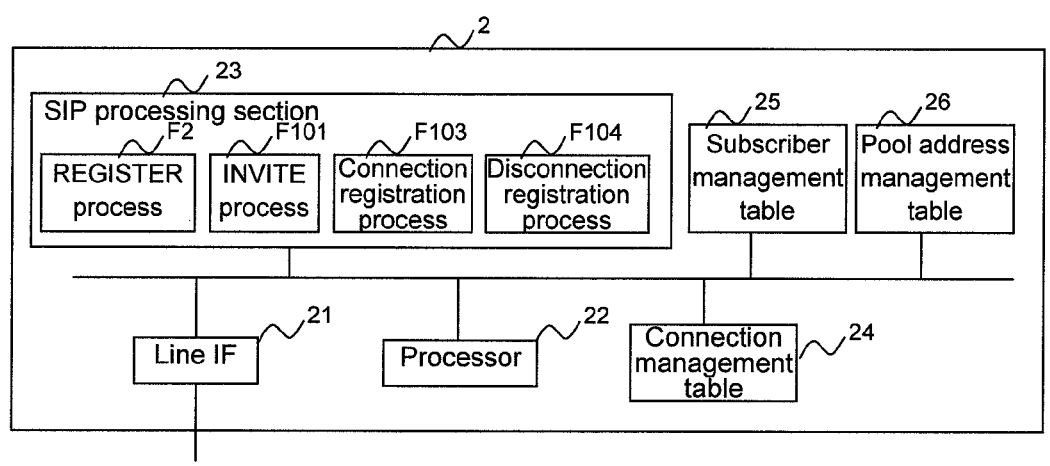
FIG. 3 is a block diagram showing the configuration of a main part of an SIP server.

FIG. 3 is a block diagram showing the configuration of a main part of the SIP server 2.

The SIP server 2 mainly comprises a line IF 21, a processor 22, an SIP processing section 23, a connection management table 24, a subscriber management table 25 and a Pool address management table 26. The SIP processing section 23 mainly performs a REGISTER process (F2), an INVITE process (F101), a connection registration process (F103) and a disconnection registration process (F104).

FIGS. 4A and 4B are views showing the table organization of the subscriber management table 25 for managing each subscriber information registered with the SIP server 2 through the REGISTER process (F2).

The subscriber management table 25 includes a subscriber telephone number 251, an SIP URI 252, an IP address 253 and an option 254.

FIGS. 5A, 5B and 5C are views showing the table organization of the connection management table 24 for management on the SIP server 2 through each of the INVITE process (F101), the connection registration process (F103) and the disconnection registration process (F104) under the session control.

The connection management table 24 includes a connection start time 241, a disconnection time 242, a status 243, the calling party information 244, the called party information 245 and the remarks 246.

Figure 6A:
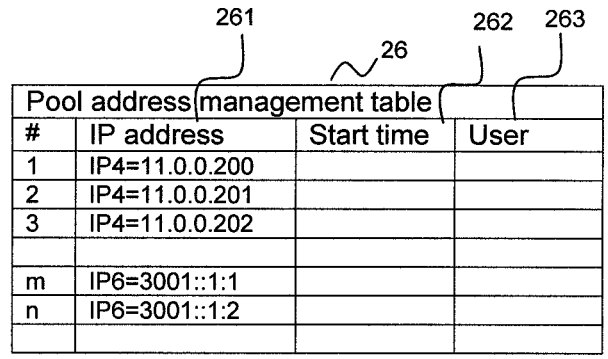
FIGS. 6A and 6B are views showing the organization of a Pool address management table.
Figure 6B:
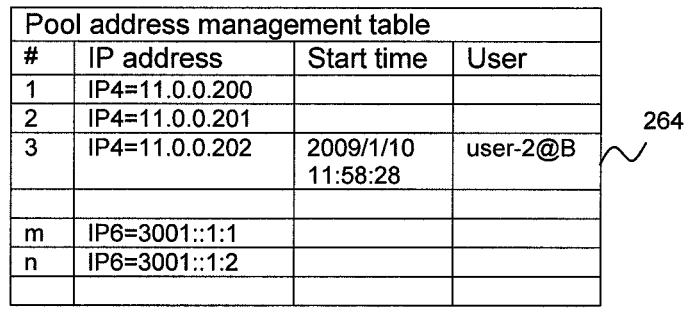

FIGS. 6A and 6B are views showing the table organization of the Pool address management table 26.

The Pool address management table 26 includes an IP address 261, a start time 262 and a user 263.

In the drawings, each table has a reference number (#).

B. Operation

A session control processing operation via the SIP server 2 to communicate between user-1@A(1-1A) and user-2@B(1-2B) according to the embodiment 1 will be described below with reference to the sequence charts of FIGS. 7 and 9, the SIP message views of FIGS. 10 to 12 and the flowcharts of FIGS. 13 to 18.

1. Registration

Figure 7:
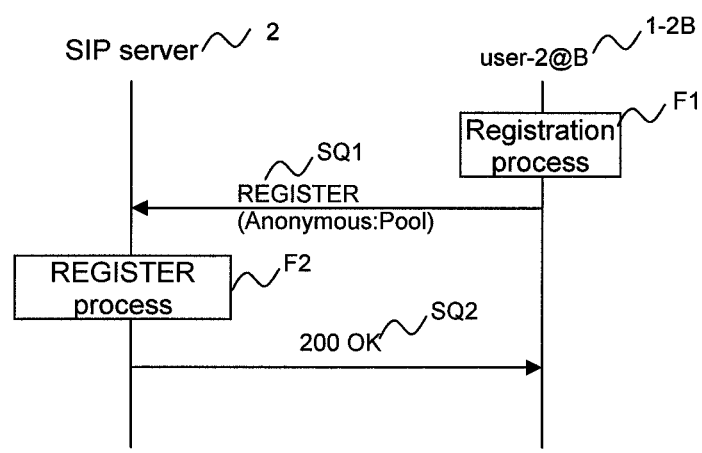
FIG. 7 is a chart showing a sequence example for registering the IP telephone terminal information with the SIP server.

FIG. 7 is a chart showing a sequence example for registering the IP telephone terminal information with the SIP server.

Figure 13:
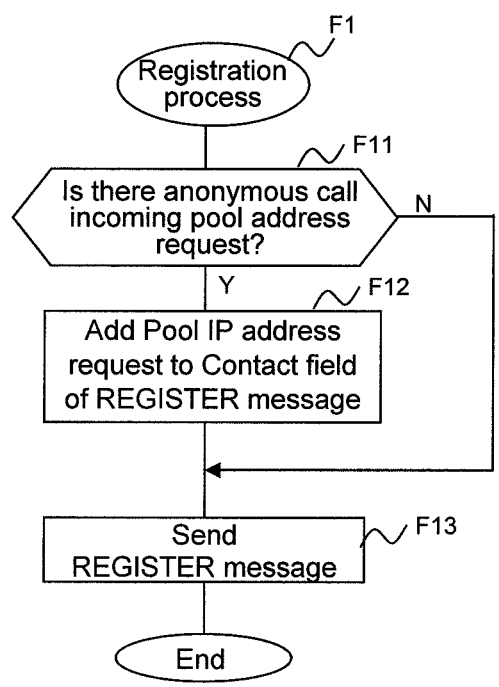
FIG. 13 is a flowchart showing a registration process flow at the IP telephone terminal.

FIG. 13 is a flowchart showing a registration process flow at the IP telephone terminal.

The SIP processing section 13 performs the registration process (F1) for the SIP server 2 to enable the communication, when the power of the user-2@B (1-2B) is turned on, as shown in the sequence chart of FIG. 7. In the registration process (F1) as shown in FIG. 13, a determination is made (F11) whether a Pool IP address is requested or not if there is an anonymous call incoming request. If the Pool IP address is not requested (N), a REGISTER message is sent (F13) with the basic information set in the REGISTER message. On the other hand, if the Pool IP address is requested (Y), in addition to the basic information, a Pool IP address request is additionally set in a Contact field of the REGISTER message (F12) to request the assignment of the pool IP address from the SIP serve 2 at the time of anonymous call incoming and the REGISTER message is sent (F13).

FIG. 8 is a view showing a description example of the REGISTER message (including a request example at the time of Anonymous).

REGISTER (Anonymous: Pool (SQ1)) with the setting of Contact:<sip:user-2@anonymous-pool> (M11) added through the registration process (F1) for the REGISTER message (M1) as shown in FIG. 8 is transferred from the user-2@B (1-2B) to the SIP server 2.

Figure 14:
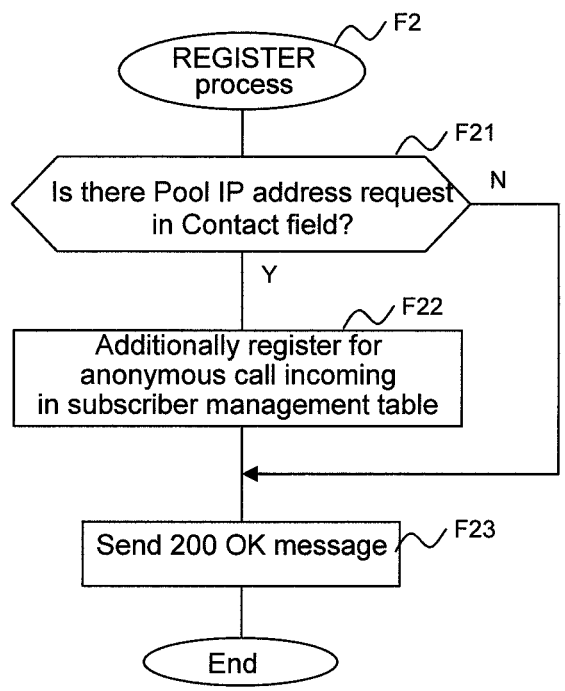
FIG. 14 is a flowchart showing a REGISTER process flow in the SIP server.

FIG. 14 is a flowchart showing a REGISTER process flow in the SIP server.

If the SIP server 2 receives the REGISTER (SQ1), the SIP processing section 23 performs the REGISTER process (F2). In the REGISTER process (F2) as shown in FIG. 14, a determination is made (F21) whether or not there is a Pool IP address request in the Contact field of the received REGISTER message (M1). Herein, if there is a setting of Contact: <sip:user-2@anonymous-pool> (M11), for example, (Y), the SIP processing section 23 registers 03-5000-2222 for the telephone number (251) and user-2@B for the SIP URI (252) from the From field and registers IPv4=11.0.0.2 for the IP address (253) from the Contact field, for example, as the basic information in #s(255) of the subscriber management table 25, as shown in FIG. 4B. Also, the SIP processing section 23 registers 03-5000-2222 for the telephone number (251), user-2@B for the SIP URI(252) and IPv4=Pool for the IP address (253), for example, in #t(256), further registers (F22) the option (254) for assigning the Pool IP address at the time of anonymous call incoming, and then sends the 200 OK message (F23).

Also, if there is no setting for the Pool IP address request at step F21 (N), the SIP processing section 23 registers only the #s(255), without registering the #t(256), and sends the 200 OK message (F23). The OK message is transferred as the 200 OK (SQ2) message from the SIP server 2 to the user-2@B(1-2B).

2. Anonymous Call Incoming

Figure 9:
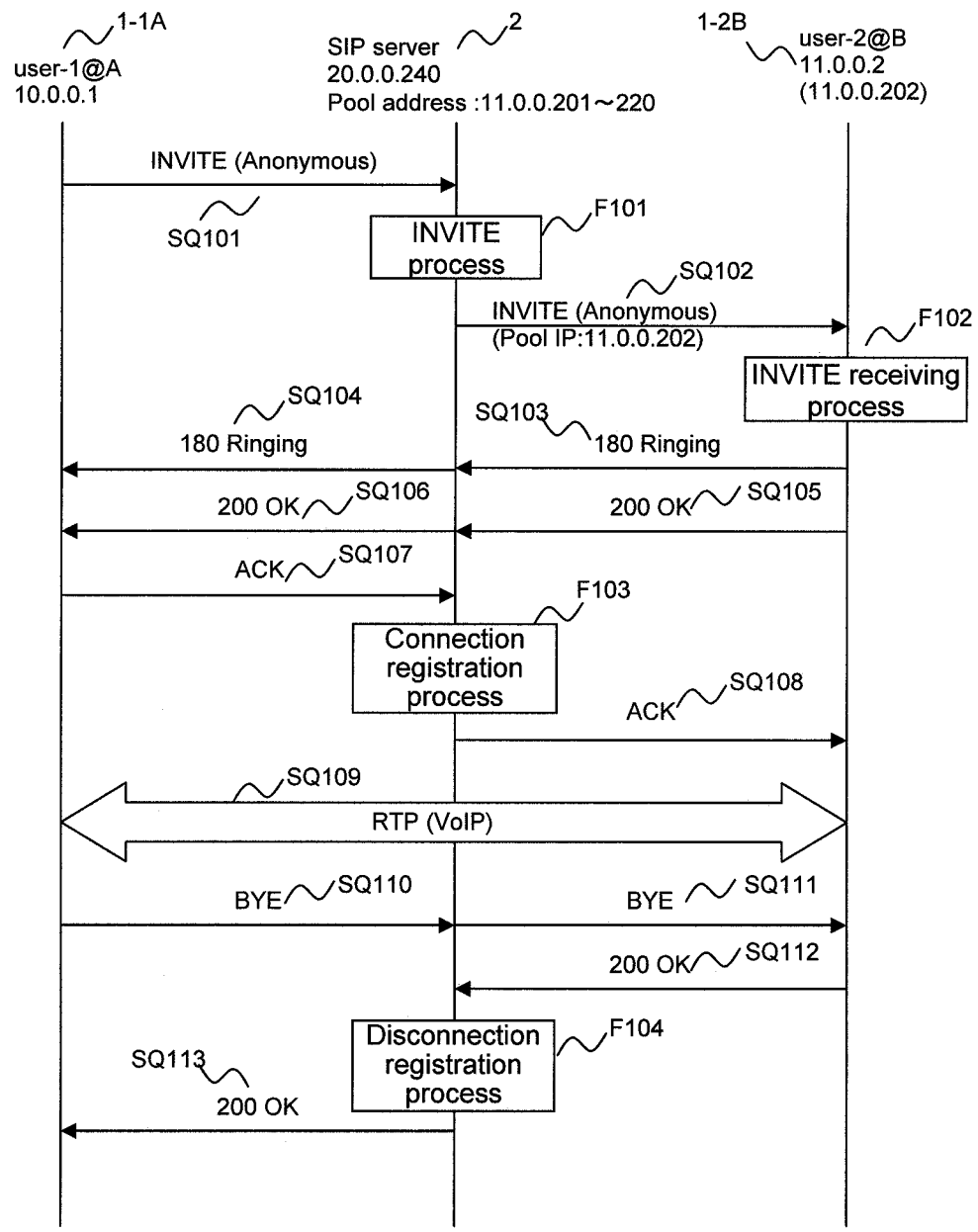
FIG. 9 is a chart showing a connection, speech and disconnection sequence example between the IP telephone terminals.

FIG. 9 is a chart showing a connection, speech and disconnection sequence example between the IP telephone terminals.

FIG. 10 is a view showing a description example of an INVITE message (at the time of calling party Anonymous) from the calling party IP telephone terminal.

Each process for making the anonymous call incoming request between user-1@A(1-1A) and user-2@B(1-2B) via the SIP server 2 in the sequence of FIG. 9 will be described below.

(Calling)

The user-1@A(1-2A) transfers the INVITE message (M101) as shown in FIG. 10 to the SIP server 2 with the INVITE (Anonymous) (SQ101). The user-1@A(1-2A) sets From:anonymous<sip:anonymous@A>; tag=qqqqqq (M1011) indicating to be anonymous, for example, as the value of From header in the INVITE message (M101) for the calling party number anonymous request.

(INVITE Process)

If the SIP server 2 receives the INVITE (SQ101), the SIP processing section 23 performs an INVITE process (F101).

Figure 15:
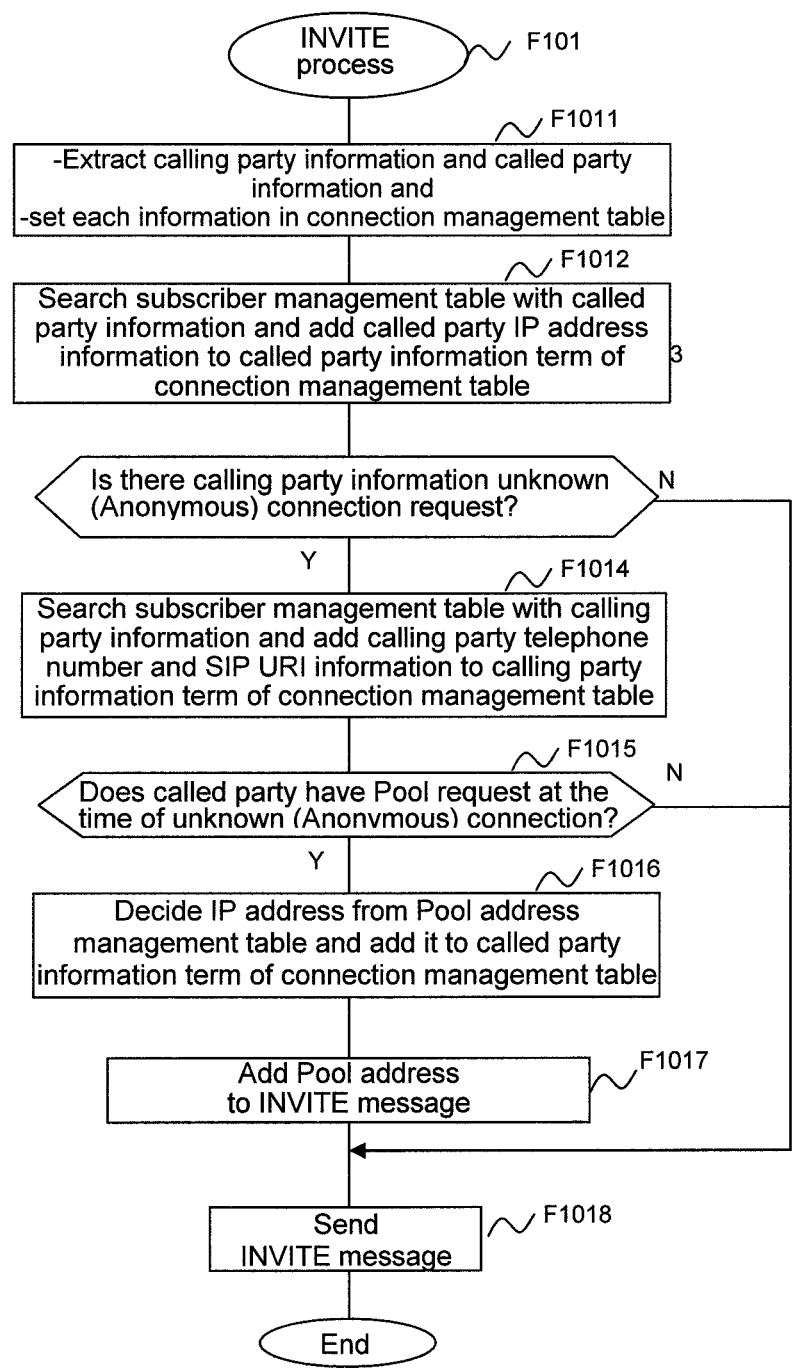
FIG. 15 is a flowchart showing an INVITE process flow in the SIP server.

FIG. 15 is a flowchart showing an INVITE process flow in the SIP server.

In the INVITE process (F101) as shown in FIG. 15, when the INVITE message (M101) is received, the connection start time (241)=2009/1/11: 58:28 for the INVITE message (M101) receiving time and the status (243)=INVITE process 200 OK wait are set, for example, in #2 (247) of the connection management table (24), as shown in FIG. 5A.

For the calling party information (244), anonymous, anonymous@A and IP4=10.0.0.1 for C=IN are set as the information from the From field value "anonymous<sip:anonymous@A>; tag=qqqqqq" (M1011) and the Contact field value "<sip:anonymous@10.0.0.1>" M1013) in the header part, for example, and the anonymous connection request is set for the remarks (246).

For the called party information (245), 03-5000-2222 and user-2@B are set as the information from the To field value "03-5000-2222<sip:user-2@B>" (M1012) in the header part, for example, (F1011).

Also, the subscriber management table (25) is searched with the value of called party information (245) (telephone number "03-5000-2222" or SIP URI "user-2@B") as the search key information to extract the IP address information on the called party side, and IP4=11.0.0.2 and pool are additionally set as the called party information (245) in the connection management table (24) (F1012).

Next, the SIP processing section 23 determines (F1013) whether or not there is the unknown (anonymous) connection request in the calling party information by referring to the connection management table (24), or from the INVITE message (M101). If there is no unknown (anonymous) connection request (N), the SIP processing section 23 sends the INVITE message (F1018). On the other hand, if there is the unknown (anonymous) connection request (Y), the SIP processing section 23 searches the subscriber management table (25) with the value of calling party information (244) (IP address "IP4=10.0.0.1") as the search key information to extract the calling party telephone number and the SIP URI information, and additionally sets the telephone number=045-111-1111 and SIP URI=user-1@A as the calling party information (244) in the connection management table (24) (F1014).

Also, the SIP processing section 23 determines whether or not there is the pool request as the called party IP address (F1015). For example, the SIP processing section 23 refers to the subscriber management table (25) based on the called party telephone number or SIP URI, in which if the IP address=Pool is set at the corresponding IP address (253), or the information of assigning the Pool IP address at the time of anonymous call incoming is set in the corresponding option (254), the SIP processing section 23 can determine that there is the pool request.

If there is no pool request (N) at step F1015, the SIP processing section 23 sends the INVITE message to the user-2@B (F1018). On the other hand, if there is the pool request (Y), the SIP processing section 23 selects the empty addresses in the Pool address management table (26) in the prescribed order or rule, assigns the IP address (261)=11.0.0.202 in #3(264), for example, with the settings of the start time (262)=2009/1/10 11:58:28 and the user (263)=user-2@B from the To field, and adds Pool=11.0. 0.202 as the called party information (245) in the connection management table (24) (F1016), as shown in FIG. 6B.

Next, the SIP processing section 23 adds the Pool address to the INVITE message to notify the assigned Pool address to the user-2@B(1-2B) (F1017).

FIG. 11 is a view showing a description example of the INVITE message (at the time of calling party Anonymous and Pool IP address assignment) from the SIP server.

For the addition of the Pool address, the assigned Pool address=11.0.0.202 is added to the INVITE message as "; pool=IN IP4 11.0.0.202 in To:03-5000-2222<sip:user-2@B>; pool=IN IP4 11.0.0.202 (M1021) in the INVITE message (M102), for example, as shown in FIG. 11.

Thereafter, the SIP processing section 23 sends the INVITE message to the user-2@B (F1018). The INVITE message is transferred as the INVITE (SQ102) from the SIP server 2 to the user-2@B(1-2B).

(INVITE Receiving Process)

Figure 16:
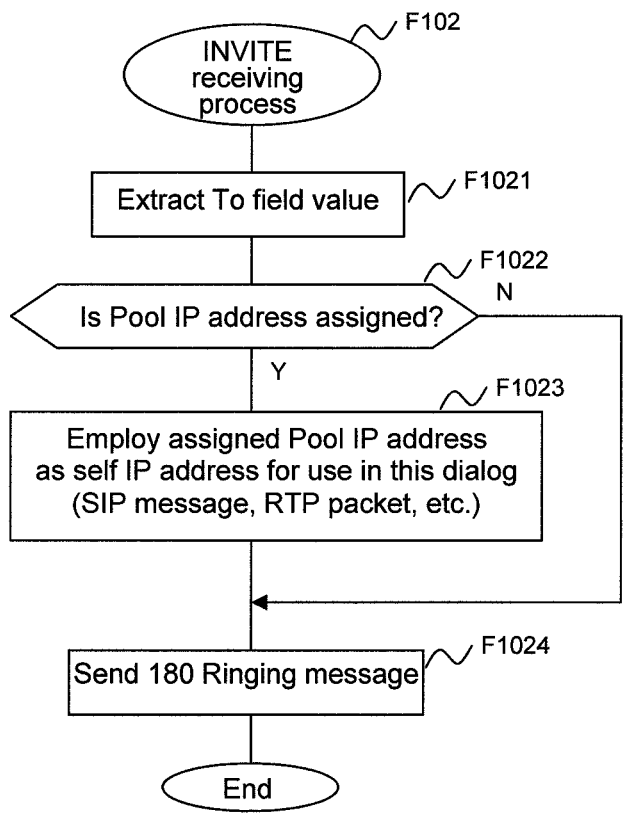
FIG. 16 is a flowchart showing an INVITE receiving process flow at the IP telephone terminal.

FIG. 16 is a flowchart showing an INVITE receiving process flow at the IP telephone terminal.

In the user-2@B(1-2B), the SIP processing section 13 performs the INVITE receiving process (F102). In the INVITE receiving process (F102) as shown in FIG. 16, the To field value in the received INVITE message (M102) is extracted (F1021), and a determination is made whether or not the Pool IP address is assigned (F1022).

For example, if there is the setting of To:03-5000-2222<sip:user-2@B>; pool=IN IP4 11.0.0.202 (M1021) (Y), the user-2@B(1-2B) employs the Pool IP address (11.0.0.202) assigned in the SIP server 2, instead of the formal IP address (11.0.0.2), as the self IP address for use in the SIP message in this dialog and the RTP packet (F1023). Thereafter, the SIP processing section 13 sends the 180 Ringing message to the SIP server 2 (F1024).

On the other hand, if there is no setting at step F1022 (N), the SIP processing section 13 sends the 180 Ringing message, the user-2@B(1-2B) employs the formal IP address (11.0.0.2) as the self IP address for use in the SIP message in this dialog and the RTP packet (F1024).

The SIP processing section 13 sends the 180 Ringing (SQ103) from the user-2@B(1-2B) to the SIP server 2.

FIG. 12 is a view showing a description example of the 180 Ringing message (at the time of setting called party IP address=Pool IP address) from the called party IP telephone terminal.

The user-2@B(1-2B) sets the Pool IP address as <sip:user-2@11.0.0.202>(M1031) to the Contact field in the 180 Ringing (M103) as shown in FIG. 12, with the 180 Ringing (SQ103) through the INVITE receiving process (F102).

(Response)

Also, the SIP server 2 receives the 180 Ringing (SQ103) from the user-2@B(1-2B), and transfers the 180 Ringing to the user-1@A(1-1A) (SQ104).

The user-2@B(1-2B) transiting to an off-hook state sends the 200 OK (SQ105) from the user-2@B (1-2B) to the SIP server 2, which then transfers it to the user-1@A(1-1A) (SQ106).

The user-1@A(1-1A) receiving the 200 OK (SQ106) sends it as an ACK (SQ107) to the SIP server 2 from the user-1@A (1-1A).

(Connection Registration Process)

Figure 17:
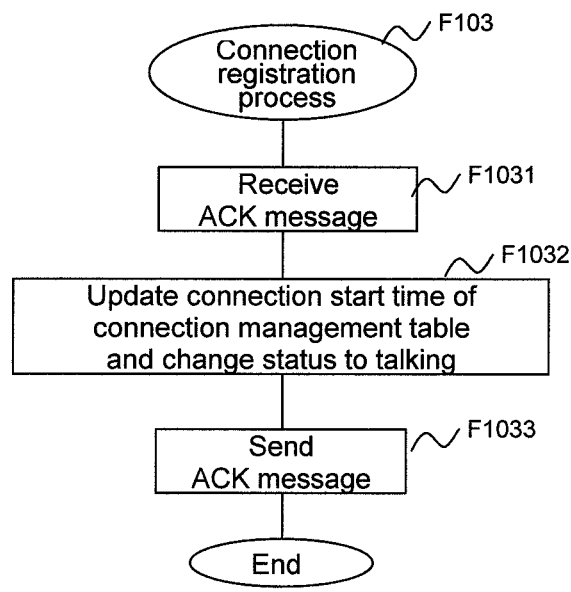
FIG. 17 is a flowchart showing a connection registration process flow in the SIP server.

FIG. 17 is a flowchart showing a connection registration process flow in the SIP server.

In the SIP server 2, the SIP processing section 23 performs a connection registration process (F103). In the connection registration process (F103) as shown in FIG. 17, the ACK message is received (F1031), the connection start time (241) is updated to 2009/1/10 11:58:29, and the status (243) is changed to the talking (F1032), as indicated at #2 in FIG. 5B. Thereafter, the SIP processing section 23 sends the ACK message (F1033). The SIP processing section 23 transfers the ACK (SQ108) from the SIP server 2 to the user-2@B(1-2B).

In this way, the RTP (VoIP) communication (SQ109) is performed between user-1@A(1-1A) and user-2@B(1-2B) under the session connection establishment control from the INVITE (SQ101) to the ACK (SQ108).

(Disconnection Registration Process)

After the completion of speech, in disconnecting from the user-1@A(1-1A), for example, BYE(SQ110) is transmitted to the SIP server 2, and transferred from the SIP server 2 to the user-2@B (1-23) (SQ111). The user-2@B(1-2B) receiving the BYE(SQ111) sends the 200 OK (SQ112) to the SIP server 2.

Figure 18:
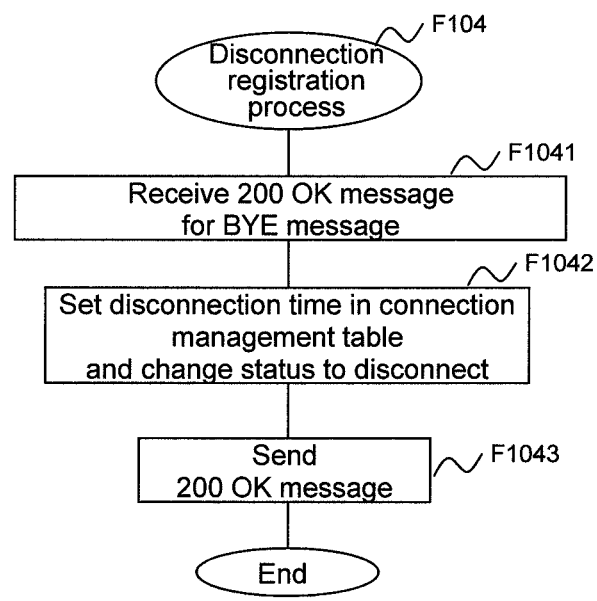
FIG. 18 is a flowchart showing a disconnection registration process flow in the SIP server.

FIG. 18 is a flowchart showing a disconnection registration process flow in the SIP server.

In the SIP server 2, the SIP processing section 23 performs a disconnection registration process (F104). In the disconnection registration process (F104) as shown in FIG. 18, the 200 OK message for the BYE message is received (F1041), and the disconnection time (242) is updated to 2009/1/10 12:4:12 and the status (243) is changed to disconnect (F1042), as indicated at #2 in FIG. 5C. Thereafter, the 200 OK message is sent (F1043). The SIP processing section 23 transfers the 200 OK message (SQ113) from the SIP server 2 to the user-1@A (1-1A).

In this way, the disconnection of the RTP (VoIP) communication (SQ109) between user-1@A(1-1A) and user-2@B (1-2B) is completed under the session disconnection control from the BYE (SQ110) to the 200 OK (SQ113).

Though in this embodiment, the SIP is used as the session control protocol and the Pool IP address is used for the called party IP address in the anonymous call incoming request (Anonymous), the session control protocol such as an MGCP, H.248 may be also used in the same way as the SIP.

Also, though the method of assigning the Pool IP address from the SIP server has been described above, the called party IP telephone terminal may request the DHCP server for the temporary IP address, if it recognizes the anonymous call incoming request (Anonymous).

What is claimed is:

1. A communication system in which a plurality of IP terminals are connected to a session control management server, the session control management server comprising:

a connection management table storing a status indicating talking or disconnected, calling party information and called party information; and a subscriber management table storing a telephone number, an identifier and an IP address for each subscriber;

wherein, where the session control management server receives a first connection request message which is an anonymous call incoming SIP invite request, from a calling IP terminal, the session control management server extracts the calling party information and the called party information from the first connection request message received from the calling IP terminal, and registers a calling party address as the calling party information and a called terminal identifier as the called party information in the connection management table;

the session control management server sends a second connection request message including the called terminal identifier and a temporary IP address assigned to a called IP terminal in the called party information to the called IP terminal;

the called IP terminal device extracts the called party information from the received second connection request message and sends a response message using the temporary IP address as a self IP address to the session control management server if the temporary IP address is included; and the session control management server makes the communication between the calling IP terminal and the called IP terminal under the session connection establishment control by referring to the connection management table with the temporary IP address, wherein the session control management server further comprises a temporary IP address of a pool address management table storing a plurality of pool IP addresses, and assigns the temporary IP address by selecting the pool IP addresses in prescribed order or rule from the pool address management table.

2. The communication system according to claim 1, wherein the session control management server further registers an anonymous identifier as the calling party information in the connection management table, and if the calling party information includes the anonymous identifier indicating an anonymous connection request, further refers to the subscriber management table in accordance with the called party information, in which if identification information of the temporary IP address assignment is stored in the IP address, the session control management server assigns the temporary IP address to the called IP terminal, and registers the temporary address in the called party information of the connection management table.

3. The communication system according to claim 1, wherein the session control management server searches the subscriber management table with the calling party IP address included in the connection request message to obtain a telephone number and/or an identifier of the calling party and adds them to the calling party information of the connection management table, if the calling party information includes the anonymous identifier indicating the anonymous connection request.

4. The communication system according to claim 1, wherein the calling IP terminal transfers the connection request message in which the anonymous identifier is set in a source field as the calling party information and the called terminal identifier is set in a destination field to the session control management server.

5. The communication system according to claim 1, wherein the session control management server makes a registration setting regarding the normally used IP address including the telephone number, identifier and IP address of the IP terminal in the subscriber management table, if there is a setting of a temporary IP address assignment request in a registration message received from the IP terminal, and makes the registration setting for a temporary IP assignment request including the telephone number and identifier of the IP terminal and temporary IP address assignment identification information at the connection request from the anonymous calling IP terminal.

6. The communication system according to claim 1, wherein the IP terminal adds the setting of requesting the temporary IP address in addition to the self IP address to the registration message in making the registration for anonymous call incoming with the session control management server, and thereby requests the assignment of the temporary address if receiving the anonymous call incoming request message.

7. The communication system according to claim 1, wherein if the anonymous connection request from the calling IP terminal is directed to the called IP terminal that is registered for the temporary IP address assignment request in the session control management server, the session control management server decides the temporary IP address from pool IP addresses, and transfers the connection request message to the called IP terminal by including the anonymous identifier in the source field, and adding the temporary IP address to the called IP terminal identifier in the destination field.

8. The communication system according to claim 1, wherein the called IP terminal receiving the assigned temporary IP address from the session control management server uses the temporary IP address as the self IP address for use in a source IP address and/or each setting parameter of the session control message.

9. A session control management server in a communication system in which a plurality of IP terminals are connected to the session control management server, the session control management server comprising:
a connection management table storing a status indicating talking or disconnected, calling party information and called party information; and
a subscriber management table storing a telephone number, an identifier and an IP address for each subscriber;
wherein,
where the session control management server receives a first connection request message which is an anonymous call incoming SIP invite request, from a calling IP terminal,
the session control management server extracts the calling party information and the called party information from the first connection request message received from the calling IP terminal, and registers a calling party address as the calling party information and a called terminal identifier as the called party information in the connection management table;
the session control management server sends a second connection request message including the called terminal identifier and a temporary IP address assigned to a called IP terminal in the called party information to the called IP terminal;
the session control management server receives a response message employing the temporary IP address as the self IP address from the called IP terminal device, and the session control management server makes a communication between the calling IP terminal and the called IP terminal under the session connection establishment control by referring to the connection management table with the temporary IP address,
wherein the session control management server further comprises a temporary IP address of a pool address management table storing a plurality of pool IP addresses, and assigns the temporary IP address by selecting the pool IP addresses in prescribed order or rule from the pool address management table.

10. A session control management server according to claim 9, wherein
an anonymous identifier as the calling party information is further registered in the connection management table, and
the session control management server, if the calling party information includes the anonymous identifier indicating an anonymous connection request, further refers to the subscriber management table in accordance with the called party information, in which if identification information of the temporary IP address assignment is stored in the IP address, the session control management server assigns the temporary IP address to the called IP terminal, and registers the temporary address in the called party information of the connection management table.

11. A session control method using a communication system in which a plurality of IP terminals are connected to a session control management server, the session control management server comprising:
a connection management table storing a status indicating talking or disconnected, calling party information and called party information; and
a subscriber management table storing a telephone number, an identifier and an IP address for each subscriber;
wherein,
where the session control management server receives a first connection request message which is an anonymous call incoming SIP invite request, from a calling IP terminal,
the session control management server extracts the calling party information and the called party information from the first connection request message received from the calling IP terminal, and registers a calling party address as the calling party information and a called terminal identifier as the called party information in the connection management table;
the session control management server sends a second connection request message including the called terminal identifier and a temporary IP address assigned to a called IP terminal in the called party information to the called IP terminal;
the called IP terminal device extracts the called party information from the received second connection request message and sends a response message using the temporary IP address as a self IP address to the session control management server if the temporary IP address is included; and
the session control management server makes the communication between the calling IP terminal and the called IP terminal under the session connection establishment control by referring to the connection management table with the temporary IP address,
wherein the session control management server further comprises a temporary IP address of a pool address management table storing a plurality of pool IP addresses, and assigns the temporary IP address by selecting the pool IP addresses in prescribed order or rule from the pool address management table.

12. The session control method according to claim 11, wherein an anonymous identifier as the calling party information is further registered in the connection management table, and the session control management server, if the calling party information includes the anonymous identifier indicating an anonymous connection request, further refers to the subscriber management table in accordance with the called party information, in which if identification information of the temporary IP address assignment is stored in the IP address, the session control management server assigns the temporary IP address to the called IP terminal, and registers the temporary address in the called party information of the connection management table.

13. The session control method according to claim 11, wherein the protocol for the session control is an SIP or MGCP, H.248.

* * * * *